United States Patent [19]

Helmich

[11] Patent Number: 4,955,326
[45] Date of Patent: Sep. 11, 1990

[54] LOW EMISSION DUAL FUEL ENGINE AND METHOD OF OPERATING SAME

[75] Inventor: Melvin J. Helmich, Grove City, Pa.

[73] Assignee: Cooper Industries, Inc., Houston, Tex.

[21] Appl. No.: 336,789

[22] Filed: Apr. 12, 1989

[51] Int. Cl.$^5$ ................................................ F02B 3/00
[52] U.S. Cl. .............................. 123/27 GE; 123/577; 123/576; 123/472
[58] Field of Search ............... 123/27 GE, 577, 576, 123/472; 239/533.2, 533.3

[56] References Cited

U.S. PATENT DOCUMENTS

| | | | |
|---|---|---|---|
| 3,406,912 | 10/1968 | Claffey | 238/533.3 |
| 4,202,500 | 5/1980 | Keiczek | 239/533.3 |
| 4,306,526 | 12/1981 | Schaub et al. | 123/257 |
| 4,437,644 | 3/1984 | Wilmers | 123/472 |
| 4,463,734 | 8/1984 | Akeroyd | 123/525 |
| 4,524,730 | 6/1985 | Doell et al. | 123/27 GE |
| 4,527,516 | 7/1985 | Foster | 123/27 GE |
| 4,603,674 | 8/1986 | Tanaka | 123/27 GE |
| 4,658,824 | 4/1987 | Scheibe | 123/472 |
| 4,704,997 | 11/1987 | Endo | 123/27 GE |
| 4,742,801 | 5/1988 | Kelgard | 123/27 GE |
| 4,817,568 | 4/1989 | Bedford | 123/27 GE |

Primary Examiner—E. Rollins Cross
Attorney, Agent, or Firm—Wigman & Cohen

[57] ABSTRACT

A dual fuel engine system and method of operating the engine reduces emission rates of polutants. The dual fuel engine includes a fuel oil supply connected to the engine and a fuel gas supply connected to the engine. Means connected between the fuel oil supply and the engine inject low levels of diesel fuel into the engine. In particular, the injection of diesel fuel is limited to pilot injection quantities only. The exhaust emission of NOx is maintained at less than 1 GM/HP-HR, where natural gas is used as the primary fuel, and less than 0.5 GM/HP-HR where digester gas is used as the primary fuel.

26 Claims, 2 Drawing Sheets

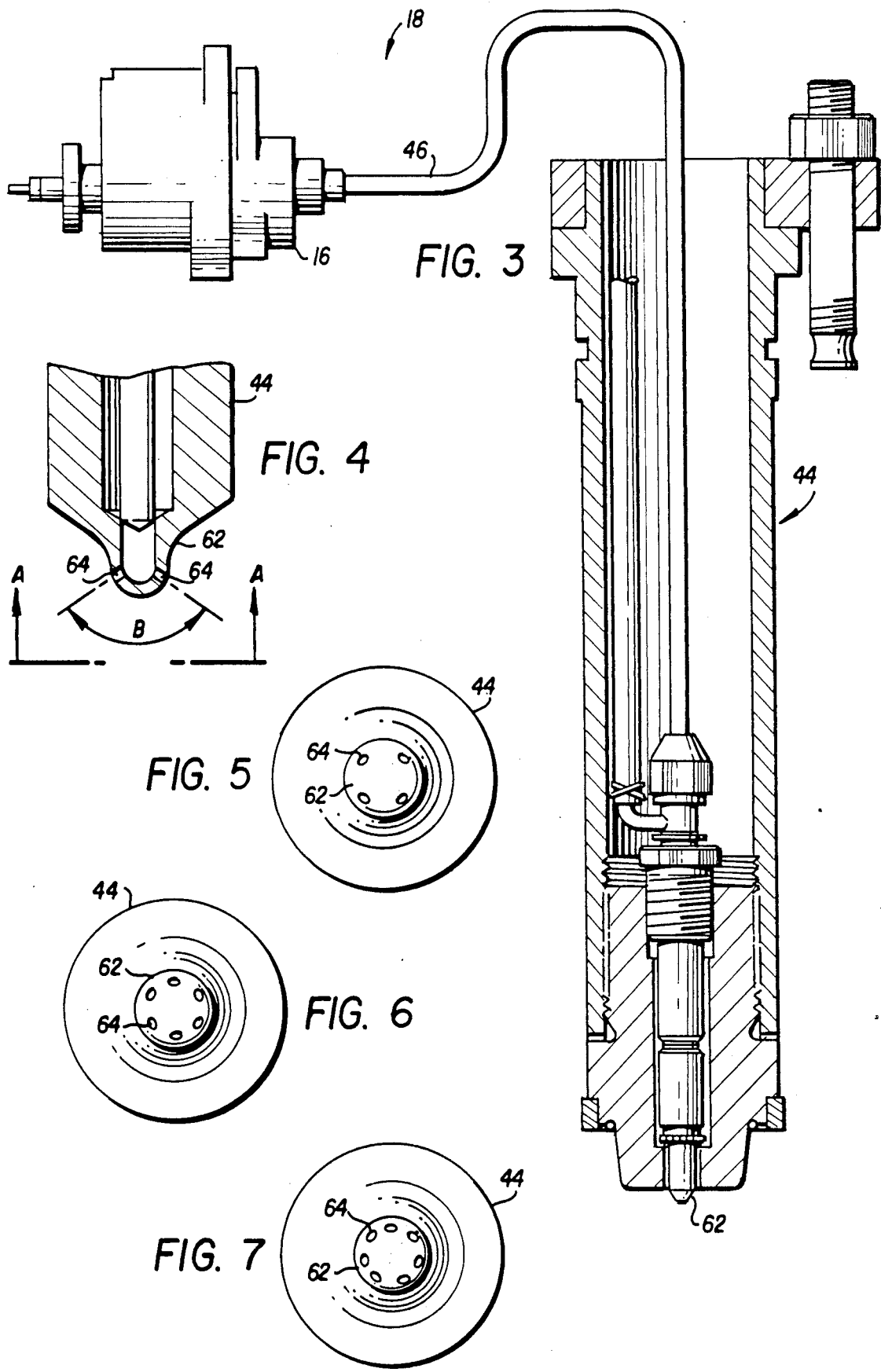

LOW EMISSION DUAL FUEL ENGINE AND METHOD OF OPERATING SAME

BACKGROUND OF THE INVENTION

The present invention relates to dual fuel engine systems, and more particularly to low gaseous exhaust emission dual fuel engine systems and a method of operating a dual fuel engine system.

Dual fuel engines are well known in the art, as evidenced by U.S. Pat. Nos. 4,603,674 to Tanaka; 4,463,734 to Akeroyd; and 4,527,516 to Foster. Conventional dual fuel engines are built to operate on the Otto cycle and employ compression ignition of an oil charge to burn a gaseous main fuel energy charge. The quantity of diesel oil injected in the pilot charge is normally 4 to 7 percent of the energy required for full load operation of the engine. In the case of the typical dual fuel engine, the diesel fuel injection system is designed so that full load operation can be achieved with diesel fuel oil delivery only, i.e., with no gaseous fuel added to the fuel charge.

Control of engine emissions, particularly NOx emissions, has become a concern in recent years, as evidenced by U.S. Pat. No. 4,306,526 to Schaub et al, of which the present inventor is a co-inventor, and U.S. Pat. No. 4,524,730 to Doell et al.

However, no dual fuel engine system to date has achieved a low emission rate of pollutants, particularly NOx levels, which is acceptable in certain parts of the United States and Europe.

SUMMARY AND OBJECTS OF THE INVENTION

In view of the foregoing limitations and shortcomings of the prior art systems, as well as other disadvantages not specifically mentioned above, it is apparent that there exists a need in the art for a dual fuel engine system and a method of operating the same to reduce pollution. Accordingly, it is a primary objective of the invention to meet that need by providing a dual fuel engine system which meets or exceeds current stringent emission standards.

More particularly, it is an object of this invention to provide a dual fuel engine system which is operable to limit the exhaust emission of NOx emissions to an emission rate of less than 1 GM/HP-HR when a gaseous fuel, such as natural gas, is used as the gaseous fuel.

Yet another object of this invention is to provide a dual fuel engine system which is operable to limit the exhaust emission of NOx emissions to an emission rate of less than 0.5 GM/HP-HR when digester gas is used as the gaseous fuel.

Still another object of this invention is to provide a method of operating a dual fuel engine so as to achieve the aforementioned low NOx emission level improvements.

Yet another object of this invention is to provide a dual fuel injection system for use in a dual fuel engine which will achieve the aforementioned low NOx emission level improvements.

Briefly described, those and other objects of the invention are accomplished according to the invention by providing a system comprising a dual fuel engine which includes a fuel oil supply connected to the engine, and a fuel gas supply connected to the engine. Means are connected between the fuel oil supply and the engine for injecting low levels of diesel fuel oil into the engine. More particularly, injection of diesel fuel is limited throughout the operating range of the engine to pilot ignition quantities only, thereby improving the exhaust emission performance of the dual fuel engine. As used herein "pilot ignition quantities" is defined as an amount of diesel fuel sufficient to provide an ignition pilot source only with no load carrying capability and is less than the 4–7% of diesel fuel required for full load operating of the normal dual fuel engine. It has been discovered that because of the low levels of diesel fuel injected into the engine, the exhaust emission of NOx can be maintained at less than 1 GM/Hp-HR where natural gas is used as the primary fuel, and to an emission rate of less than 0.5 GM/HP-HR where a digester gas is used as the gaseous fuel. "Digester gas" as used herein is a combustible gas usually obtained from landfills and sewage treatment facilities and is diluted with inert gases, such as $CO_2$, in an amount of about 50%.

BRIEF DESCRIPTION OF THE DRAWINGS

With the foregoing and other objects, advantages and features of the invention that will become hereinafter apparent, the nature of the invention may be more clearly understood by reference to the following detailed description of the invention, the appended claims and to the several views illustrated in the attached drawings.

FIG. 3 is a front view of a second embodiment of a diesel oil fuel injection system in accordance with the invention, illustrating a pencil-type fuel injection nozzle connected to the fuel injection pump, with the fuel injection nozzle illustrated in cross-section and the pump illustrated schematically;

FIG. 4 is a fragmentary cross-sectional front view of the nozzle spray tip of the fuel injection nozzle illustrated in FIG. 2, showing the configuration of the orifices for injection of fuel oil into an individual cylinder of the dual fuel engine, in accordance with the invention;

FIG. 5 is an end view of the nozzle spray tip illustrated in FIG. 4, as viewed in the direction of line A—A of FIG. 4;

FIG. 6 is an alternate embodiment of a nozzle spray tip in an end view similar to that of FIG. 5; and FIG. 7 is an additional alternate embodiment of a nozzle spray tip in an end view similar to that of FIG. 5.

DETAILED DESCRIPTION OF THE PREFERRED EMBODIMENTS

Figure 1:
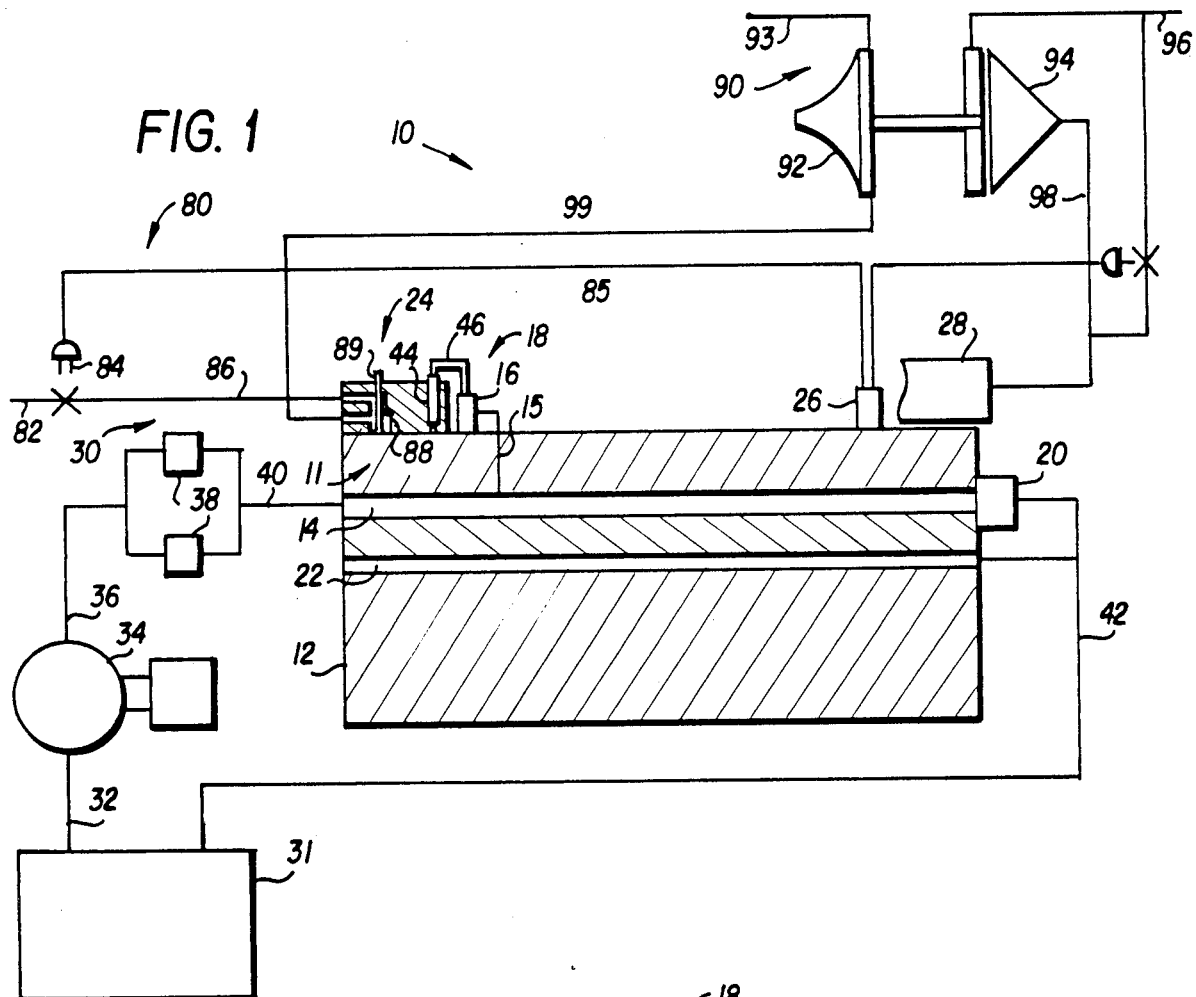
FIG. 1 is a schematic diagram illustrating the dual fuel engine system in accordance with the present invention.

Referring now in detail to the drawings wherein like parts are designated by like reference numerals throughout, there is schematically illustrated in FIG. 1 a dual fuel engine system which is designated generally by reference numeral 10. Dual fuel engine system 10 incorporates generally a dual fuel engine 12, a fuel oil supply system 30, a fuel gas supply system 80, and, optionally, a turbocharger 90.

DUAL FUEL ENGINE

Generally described, dual fuel engine system 10 includes a dual fuel engine 12 which is of the large, stationary, reciprocating engine type. In the preferred embodiment described herein, the dual fuel engine 12 is a LSVB-20-GDT four cycle engine manufactured by Cooper-Bessemer Reciprocating Division of Cooper Industries, the assignee of this invention. Dual fuel engine 12 includes a plurality of cylinders, only one of which is illustrated schematically in FIG. 1 and is designated generally by reference numeral 11. The cylinders and the reciprocating pistons (not shown) in the cylinders are arranged in a V configuration, have a 15½ in. bore, a 22 in. stroke, and develop 420 BHP per cylinder at 400 engine RPM. While the LSVB engine is typically built with 12, 16, or 20 cylinders, it will be appreciated that the invention may be applicable to any type of large reciprocating engine whether stationary or mobile.

Dual fuel engine 12 is provided with a diesel fuel supply header 14 for supply of diesel fuel through line 15 to a plurality of individual fuel injection pumps 16 (only one shown) of a diesel fuel injection system 18 for each cylinder 11 of the dual fuel engine, as will be described in detail hereinafter. The pressure in diesel fuel supply header 14 is regulated by a pressure regulator 20, and a diesel fuel drain header 22 collects excess fuel oil not used by fuel injection pumps 16 for reuse. Each cylinder of dual fuel engine 12 is also provided with a gas induction system 24 for supply of gaseous fuel mixed with air. A governor 26 provided on dual fuel engine 12 supplies a signal to adjust the pressure of the fuel gas supplied by gas induction system 24, and a signal to control the exhaust gas exhausted from an exhaust manifold 28 of dual fuel engine 12 in a manner known in the art and therefore not described in further detail herein.

FUEL OIL SUPPLY SYSTEM

Still referring to FIG. 1, the system for supplying diesel oil fuel to the cylinders of the dual fuel engine, designated generally by reference numeral 30, will now be described in detail. A supply of diesel oil fuel is held in a fuel oil day tank 31. Fuel is pumped from tank 31 through line 32 by fuel oil transfer pump 34, through line 36 to duplex filters 38, thence through line 40 to fuel oil supply header 14. Pressure of the diesel oil in fuel oil supply header 14 is regulated by pressure regulator 20, connected to fuel oil return line 42. Diesel oil fuel flows from header 14 via line 15 to the individual fuel injection pumps 16 of a diesel oil fuel injection system 18 provided for each of the plurality of cylinders of dual fuel engine 12.

Figure 2:
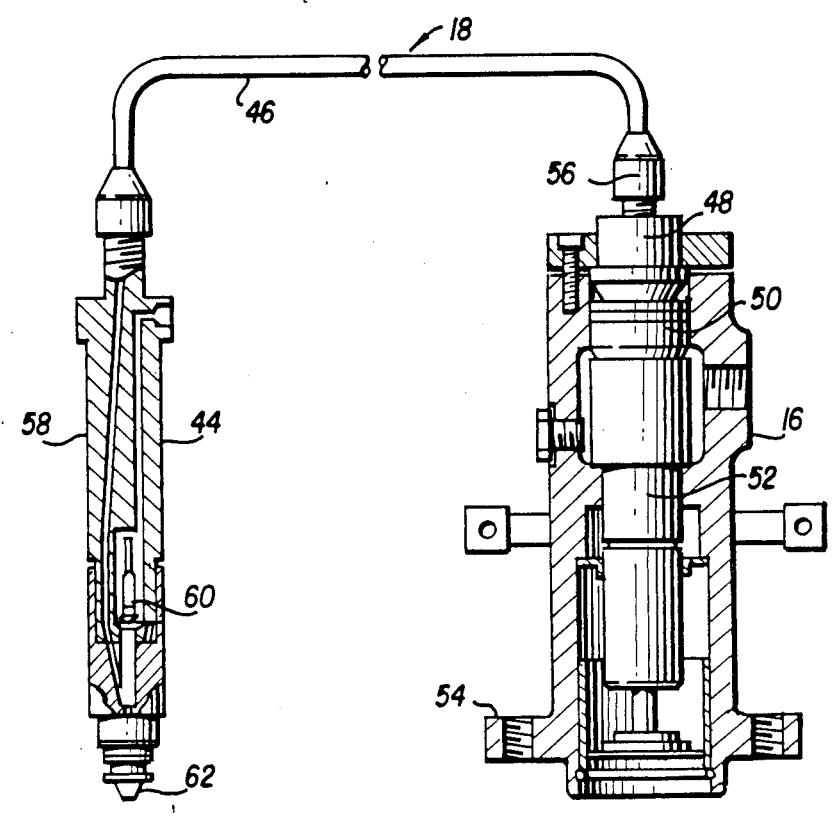
FIG. 2 is a front view of a first embodiment of the diesel oil fuel injection system in accordance with the invention, illustrating the fuel injection nozzle connected to the fuel injection pump, with the fuel injection nozzle and pump illustrated in cross-section.

Referring now to FIG. 2 wherein the fuel oil injection system 18 of FIG. 1 is illustrated in greater detail, fuel oil injection system 18 comprises generally a fuel injection pump 16 and a fuel injection nozzle 44 which is supplied with fuel from pump 16 through high-pressure fuel line 46. Fuel injection pump 16 is of the "jerk pump" type known in the art and is located on the cylinder block directly above the cam follower in the Cooper-Bessemer LSVB engine. Pump 16 generally comprises a delivery valve holder 48, a delivery valve assembly 50, and a barrel and plunger assembly 52. Flanges 54 are provided for connection of pump 16 to the cylinder block of dual fuel engine 12. A high pressure line nut 56 connects delivery valve holder 48 to high pressure line 46. Further details of the structure and operation of pump 16 are not provided since pump 16 is of a type conventionally available from manufacturers such as Bendix and L'Orange GmbH of Stuttgart, West Germany.

Fuel oil is pumped from pump 16 through high pressure line 46 to fuel injection nozzle 44 from which it is sprayed into an individual cylinder 11 of the dual fuel engine 12. The fuel injection nozzle 44 is located at the center of the cylinder head in the LSVB engine. Fuel injection nozzle 44 comprises generally a nozzle body holder 58, a nozzle valve assembly 60, and a nozzle spray tip 62 projecting into the combustion chamber of the cylinder 11. Further details of the structure and operation of nozzle 44 are not provided since nozzle 44, similar to pump 16, is conventionally available from manufacturers such as the Bendix and L'Orange GmbH.

Nozzle spray tip 62 is provided with a specified number of orifices arranged annularly around the tip, each orifice having a specified diameter and arranged at a specified angle with respect to the longitudinal axis of the nozzle 44, in order to provide a precisely metered quantity and spray configuration of fuel injected into the cylinder. In accordance with the present invention, the orifices of the spray tip 62 are so structured and configured in terms of number, size and spray angle as to limit the supply of diesel fuel to the each cylinder to pilot ignition quantities only as defined hereinabove. Operation of the dual fuel engine with pilot ignition quantities of diesel fuel results in a significant reduction of NOx emissions, more specifically according to the present invention to an emission rate of less than 1 GM/HP-HR of NOx.

Referring now to FIGS. 4 through 7, there are illustrated details of various embodiments of the portion of fuel injection nozzle 44, which includes nozzle spray tip 62 constructed according to the invention. Nozzle spray tip 62 comprises a plurality of orifices 64, which are typically arranged symmetrically about the central longitudinal axis of nozzle 44. Orifices 64 are oriented with their axes at a predetermined spray angle, defined in FIG. 4 as angle B. The number of orifices, orifice diameter, and spray angle are determined empirically for a given dual fuel engine, to produce the desired pilot ignition quantity of fuel oil which will result in the reduced exhaust emission rate set forth hereinabove. As illustrated in FIGS. 5, 6 and 7, three embodiments of nozzle spray tips 62 according to the invention are provided with 4, 6, and 7 orifices 64, respectively, for use with the LSVB engine described above. Values of the orifice diameter and spray angle for the embodiments of FIGS. 5 and 6 are set forth in Table I below, while in the embodiment of FIG. 7, the seven (7) orifices 64 have a diameter of 0.0177 in. and are set at a spray angle B of 140°.

During the course of development of the present invention, several embodiments of dual fuel engine systems were tested. Those embodiments are summarized below.

TABLE I

|  | Nozzle | Tip | Percent Pilot Oil | Specific Emission Rate NOx (GM/HP-HR) |
|---|---|---|---|---|
| System One (Prior Art) Standard system | LSVB Universal | 8 - Orifices 0.0177 in. diameter | 6.0 | 4.70 |

TABLE I-continued

| | Nozzle | Tip | Percent Pilot Oil | Specific Emission Rate NOx (GM/HP-HR) |
|---|---|---|---|---|
| System Two (1st experiment) Modified tip | LSVB Universal | 140° spray angle 6 - Orifices 0.0157 in. diameter 120° spray nozzle | 4.8 | 4.31 |
| System Three (2nd experiment) Modified nozzle Tip | JS Universal | 4 - Orifices 0.0157 in. diameter 120° spray angle | 2.2 | 0.95 |
| System Four (3rd experiment) Pump and modified nozzle | Pilot Nozzle | 6 - Orifices 0.0106 in. diameter 120° spray angle | 1.54 | 0.80 |

It is apparent from the foregoing Table I that in the embodiments of System One (Prior Art) and System Two (1st experiment) specific emission rates of NOx emissions exceeded 4.0 GM/HP-HR where the percent pilot oil was in the typical prior art range of 4–7%. However, in the embodiments of System Three (2nd experiment) and System Four (3rd experiment), specific emission rates of NOx emissions were reduced to less than 1.0 GM/HP-HR where the percent pilot oil was maintained below the 4–7% range, i.e., limited to pilot ignition quantities only.

Referring now to FIG. 3, an additional embodiment of fuel oil injection system 18 according to the invention is illustrated. In the FIG. 3 embodiment, fuel injection nozzle 44 is a "Pencil Nozzle" made by the Stanadyne Company and identified as a 5.4 mm "Slim Tip," Pencil Nozzle. Fuel injection nozzle 44 is supplied with fuel oil through high pressure line 46 by pump 16, which in the illustrated embodiment is the BD-2 "automotive" type pump also manufactured by the Stanadyne Company. The fuel injection system 18 of FIG. 3 is identified in Table I as System Four, and uses a nozzle spray 62 having 6 orifices of 0.0106 in. diameter, set at a 120° spray angle.

FUEL GAS SUPPLY

Referring once again to FIG. 1, dual fuel engine system 10 is provided with a fuel gas supply system, generally designated by reference numeral 80. Before proceeding with an explanation of the fuel gas supply system 80, a brief explanation of the characteristics of the gaseous fuel used in dual fuel engine system 10 is appropriate.

The gaseous fuels used in such systems have two heating values: a high heating value (HHV), which includes the heat content of the water vapor released during combustion of hydrocarbons and oxygen; and a low heating value (LHV), which excludes the heat content of the water vapor. For example, natural gas has a HHV of 1000 BTU/ft$^3$ and a LHV of 930 BTU/ft$^3$. For various reasons, when specifying the heat content of a gaseous fuel it is customary in the industry to refer to the LHV. Unless otherwise stated, that usage is employed in the present specification when referring to gaseous fuel heating values.

Normally, a natural gas fuel with a heat content of 930 BTU/ft$^3$ is used in the dual fuel engine described above. However, according to another aspect of the present invention, it is appropriate to use alternative gaseous fuels, such as a digester gas to further reduce polluting exhaust emissions, particularly those containing NOx emissions. Digester gas is a relatively low heat content hydrocarbon gaseous fuel obtained from landfills and/or sewage treatment facilities and is diluted with inert components, such as $CO_2$, which constitute up to about 50 percent of the prime gaseous fuel charge. Such digester gas has a low heating value of 450–550 BTU/ft$^3$.

Where digester gas is used as the fuel gas for dual fuel engine system 10, still further improvements can be made in emissions rate reductions. For example, when digester gas is used as the fuel gas in the embodiment of the invention described in the above Table I as System Four, specific NOx emission rates are reduced to 0.47 GM/Hp-HR, with 1.4 percent pilot oil. NOx emissions according to this embodiment of the invention are thus reduced below 0.5 GM/HP-HR.

Fuel gas supply system 80 comprises generally a supply of fuel gas through a line 82, a gas regulating valve 84 which regulates the pressure of gaseous fuel supplied to the engine, and a line 86 through which the pressure regulated gaseous fuel is supplied to a gas induction system generally designated by reference numeral 24. Gas regulating valve 84 is controlled by a signal generated by governor 26 through a control line 85. Air is supplied to gas induction system 24 through a line 99 from a turbocharger 90.

Gas induction system 24 comprises generally a gas inlet valve 88 and an air inlet valve 89. Gaseous fuel to the engine is inducted from line 86 through gas valve 88 which is concentric to and commonly operable with air inlet valve 89 as described below. Air inlet valve 89 is opened by a conventional cam-operated valve gear. After the air inlet valve 89 begins to open, a shoulder on the air inlet valve stem pushes open the gas inlet valve 88 to create a delayed opening of the latter, and gaseous fuel flows into the combustion chamber of cylinder 11 in concert with the inlet air.

TURBOCHARGER

Referring again to FIG. 1, dual fuel engine system 10 is optionally supplied with a turbocharger, generally designated by reference numeral 90. Turbocharger 90 comprises an impeller 92, a turbine 94, an exhaust stack 96, a turbine inlet line 98, and a turbocharged air discharge line 99. As is conventional, turbine 94 receives exhaust gas from exhaust manifold 28 of dual fuel engine 12. The exhaust gas rotates the blades of turbine 94 and compresses the air supplied to impeller 92 through air inlet line 93. The turbocharged air is discharged from impeller 92 through line 99 where it is supplied to the air inlet valve 89 of gas induction system 24 for mixing with the gaseous fuel. By means of turbocharger 90, a high air charging pressure, in excess of 28 psig is imparted to the air supplied to the engine, thereby further enhancing the exhaust emission performance of the dual fuel engine.

In addition to the use of a turbocharger, the exhaust emission performance of the dual fuel engine may be further improved by imparting a high swirl or turbulence to the gaseous fuel mixture within the combustion chamber, using conventional engine design techniques.

Although only preferred embodiments are specifically illustrated and described herein, it will be appreci-

What is claimed is:

1. A low emission duel fuel engine system comprising:
   a dual fuel engine having a combustion chamber;
   a fuel oil supply connected to said engine;
   a fuel gas supply connected to said engine; and
   means connected between said fuel oil supply and said engine for injecting fuel oil into said engine, said means connected between said engine and fuel oil supply limiting the injection of fuel oil to the combustion chamber to pilot ignition quantities only, wherein said limiting means includes means for limiting the injection of fuel oil such that the exhaust emission of NOx is at an emission rate of less than 1 GM/PH-HR, whereby the exhaust emission performance of the dual fuel engine is enhanced.

2. The dual fuel engine system of claim 1 wherein said fuel oil is diesel fuel.

3. The dual fuel engine system of claim 1 wherein said fuel gas is natural gas.

4. The dual fuel engine system of claim 1 wherein said limiting means limits the injection of fuel oil such that the exhaust emission of NOx is at an emission rate to less than 0.5 GM/HP-HR.

5. The dual fuel engine system of claim 4 wherein said fuel gas is digester gas.

6. The dual fuel engine system of claim 1 wherein said means connected between said fuel oil supply and said engine comprises a fuel injection pump connected by a high-pressure line to a fuel injection nozzle.

7. The dual fuel engine system of claim 6 wherein said fuel injection nozzle comprises an annular nozzle spray tip, said tip having four orifices for the passage therethrough of fuel oil, each of said orifices having a diameter of about 0.0157 in., said orifices being disposed at a spray angle of 120° with respect to the longitudinal axis of said fuel injection nozzle.

8. The dual fuel engine system of claim 6 wherein said fuel injection nozzle comprises an annular nozzle spray tip, said tip having six orifices having a diameter of about 0.0106 in., said orifices being disposed at a spray angle of 120° with respect to the longitudinal axis of said fuel injection nozzle.

9. The dual fuel engine system of claim 8 wherein said fuel injection pump connected between said fuel oil supply and said engine comprises an automatic type fuel pump and said fuel injection nozzle comprises a pencil type fuel injection nozzle.

10. The dual fuel engine system of claim 6 wherein said fuel injection nozzle comprises an annular nozzle spray tip, said tip having seven orifices having a diameter of about 0.0177 in., said orifices being disposed at a spray angle of 140° with respect to the longitudinal axis of said fuel injection nozzle.

11. The dual fuel engine system of claim 6 wherein said fuel gas supply is connected to said engine by means of a fuel induction system.

12. The dual fuel engine system of claim 11 wherein said fuel induction system comprises an air inlet valve concentrically disposed relative to a gas inlet valve, said valves being commonly operable so as to mix air and gaseous fuel supplied to said engine.

13. The dual fuel engine system of claim 11 further comprising turbocharger means connected to said induction system for supplying of compressed air to said air inlet valve.

14. A method of operating a dual fuel engine comprising:
   injecting fuel oil to said engine;
   supplying fuel gas into said engine;
   limiting the injection of fuel oil to said engine to pilot ignition quantities wherein an exhaust emission of NOx is limited to an emission rate of less than 1 GM/HP-HR, whereby the exhaust emission performance of the dual fuel engine is enhanced.

15. The method of claim 14 wherein said fuel gas is natural gas.

16. The method of claim 14 wherein said fuel gas is digester gas.

17. A combustion system for a dual fuel engine comprising:
   an engine;
   a fuel oil supply for said engine;
   a fuel gas supply for said engine; and
   means connected between said fuel oil supply and said engine for injection fuel into said engine, said means connected between said engine and said fuel oil supply limiting the injection of fuel oil to pilot ignition quantities only, wherein said limiting means includes means for limiting the injection of fuel oil such that the exhaust emission of NOx is at an emission rate of less than 1 GM/HP-HR, whereby the exhaust emission performance of the dual fuel engine is enhanced.

18. The combustion system of claim 17 wherein said fuel oil is diesel fuel.

19. The combustion system of claim 17 wherein said fuel gas is natural gas.

20. The combustion system of claim 17 wherein said limiting means limits the exhaust emission of NOx to an emission rate of less than 0.5 GM/HP-HR.

21. The combustion system of claim 20 wherein said fuel gas is digester gas.

22. The combustion system of claim 17 wherein said means connected between said fuel oil supply and said engine comprises a fuel injection pump connected by a high-pressure line to a fuel injection nozzle.

23. The combustion system of claim 22 wherein said fuel injection nozzle comprises an annular nozzle spray tip, said tip having four orifices for the passage therethrough of fuel oil, each of said orifices having a diameter of about 0.0157 in., said orifices being disposed at a spray angle of 120° with respect to the longitudinal axis of said fuel injection nozzle.

24. The combustion system of claim 22 wherein said fuel injection nozzle comprises an annular nozzle spray tip, said tip having six orifices having a diameter of about 0.0106 in., said orifices being disposed at a spray angle of 120° with respect to the longitudinal axis of said fuel injection nozzle.

25. The combustion system of claim 24 wherein said fuel injection pump connected between said fuel oil supply and said engine comprises automatic type fuel pump and said fuel injection nozzle comprises a pencil type fuel injection nozzle.

26. The combustion system of claim 22 wherein said fuel injection nozzle comprises an annular nozzle spray tip, said tip having seven orifices having a diameter of about 0.0177 in., said orifices being disposed at a spray angle of 140° with respect to the longitudinal axis of said fuel injection nozzle.

* * * * *